Oct. 5, 1965 F. PRAPIS 3,210,613

TIMING CIRCUIT

Filed Aug. 17, 1962

INVENTOR.
FRANK PRAPIS
BY Roland Plottel
ATTORNEY 3,210,613
Patented Oct. 5, 1965

3,210,613

TIMING CIRCUIT

Frank Prapis, Paterson, N.J., assignor to The Bendix Corporation, Teterboro, N.J., a corporation of Delaware Filed Aug. 17, 1962, Ser. No. 217,555
7 Claims. (Cl. 317—142)

The invention relates generally to timing circuits and more particularly to time delay circuits.

One object of the invention is to provide a novel timing circuit producing a signal after a predetermined time delay.

Another object of the invention is to provide a novel time delay circuit producing two signals, the second of which is delayed a predetermined time from the first signal, and of opposite polarity to the first signal.

Another object of the invention is to provide a novel timing circuit producing a time delayed pulse of a predetermined energy content.

Another object of the invention is to provide a novel time delay circuit using regenerative feedback bias means to provide a sharp switching action after the predetermined time delay.

Another object of the invention is to provide a novel time delay circuit for setting a latching type-relay upon application of a potential, and then resetting the relay after a predetermined time delay.

The invention contemplates a timing circuit comprising time delay means providing a time delayed signal, switching means connected to the time delay means rendered conducting when the signal from the time delay means exceeds a predetermined level, energy storage means for storing energy upon the application of a potential thereto, and load means connected to the storage energy means and energized thereby when the switching means is rendered conducting by the time delay means.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawings are for illustration purposes only and are not to be construed as defining the limits of the invention.

Figure 1:
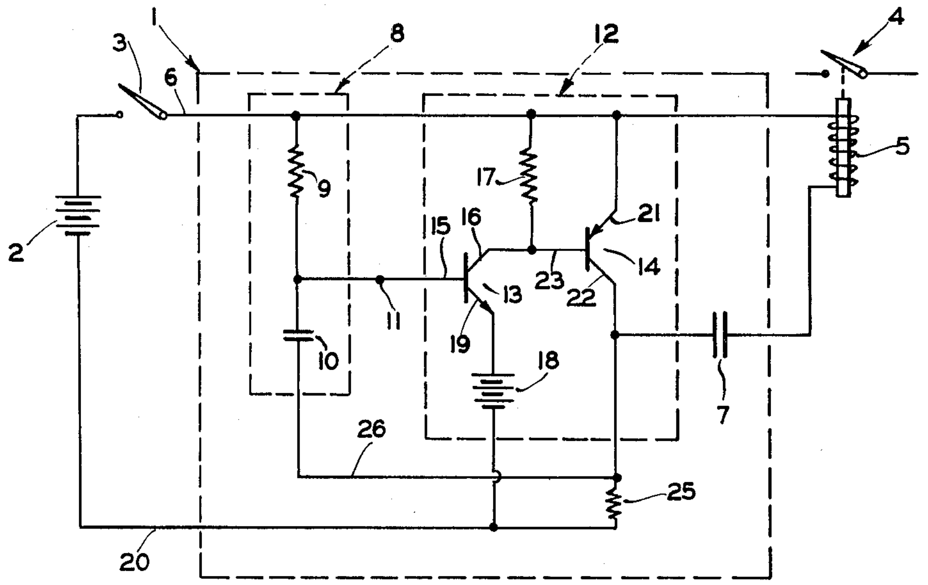
FIGURE 1 is a schematic drawing of a novel time delay circuit constructed in accordance with the invention.

Referring to the schematic drawing of FIGURE 1, shown therein is a novel time delay circuit 1 energized from a source of potential 2 by closing a switch 3. Time delay circuit 1 supplies signals in the form of pulses to a load constructed according to the invention, and shown here as a latching relay 4 of the type that is set upon the application of a positive pulse across a coil 5 of the relay and is reset upon the application of a negative pulse across coil 5.

When switch 3 is closed, a positive potential from source 2 is applied to conductor 6. This potential momentarily appears across coil 5 and is stored across a storage capacitor 7, serially connected to coil 5. Simultaneously, the potential is applied to a time delay means 8 consisting of a resistor 9 and a capacitor 10, which provides at an output terminal 11 an exponentially increasing voltage.

Output terminal 11 of time delay means 8 is connected to a switching means 12 including transistors 13 and 14. Base 15 of transistor 13 is connected to terminal 11. Collector 16 of transistor 13 is connected through a resistor 17 to conductor 6. Transistor 13, in the absence of a signal at base 15, is biased beyond cutoff a predetermined amount by a suitable biasing means shown here as a battery 18 connected between emitter 19 of transistor 13 and common 20. When the voltage at terminal 11 exceeds the voltage of bias 18, transistor 13 conducts.

Second transistor 14 has an emitter 21 connected to coil 5, a collector 22 connected to capacitor 7, and a base 23 connected to collector 16 of transistor 13. Transistor 13, when nonconducting, maintains base 23 of transistor 14 at the same potential as emitter 21 of transistor 14, so that transistor 14 is nonconducting.

Upon closing switch 3, a positive pulse energizes coil 5, and a voltage exponentially builds up across capacitor 10. When the voltage across capacitor 10 exceeds the voltage of bias 18, transistor 13 conducts producing a voltage drop across resistor 17 to lower the potential at base 23 and render transistor 14 conducting. Transistor 14 is rapidly driven to a maximum conducting state by a regenerative or positive feedback means including resistor 25 and conductor 26. The regenerative feedback biasing resistor 25 is a desirable, additional feature that increases the speed of the switching action but is not essential.

As transistor 14 begins to conduct, current flows from potential source 2 through transistor 14 and resistor 25 to common 20 impressing a potential across resistor 25. This potential is fed back to the time delay means 8 through conductor 26 increasing the potential of time delay means 8 and also the potential at output terminal 11, thus driving transistor 13 into saturation. The increased current flow through transistor 13 increases the potential drop across resistor 17, decreasing the potential at base 23 to drive transistor 14 into saturation. The regenerative feedback action is very rapid, and transistor 14 is quickly switched from a nonconducting to a maximum conducting state.

As transistor 14 goes to saturation, it presents a virtual short circuit from emitter 21 to collector 22. Storage capacitor 7 then discharges through coil 5 and transistor 14 to provide a reset pulse to load 4.

The energy content of the reset pulse is controllable by the size and type of capacitor 7 and the amount of resistance in the discharge loop.

The reset pulse occurs a predetermined time after the closing of switch 3. The time delay is determined by resistor 9 and capacitor 10 and is the time required for capacitor 10 to charge up to a potential equal to the potential provided by bias means 18. In a practical circuit, the value of resistor 9 is much larger than the value of resistor 25 so that resistor 25 may be disregarded in determining the time delay of time delay means 8. The time constant of capacitor 10—resistor 9 must be at least three times larger than the time constant of capacitor 7—resistor 25 (and any resistances (not shown) associated with coil 5). This relation is necessary because the transient occurring upon closing switch 3 charges storage capacitor 7 and also appears across resistor 25. The transient across resistor 25 is fed back to time delay means 8 through conductor 26. If the time constant of capacitor 10—resistor 9 is short and an appreciable charge has already built up on capacitor 10, the added transient from resistor 25 triggers transistor 13. Also, the bias level of bias means 18 should be sufficiently large so that the feedback transient does not trigger transistor 13 prematurely.

Figure 2:
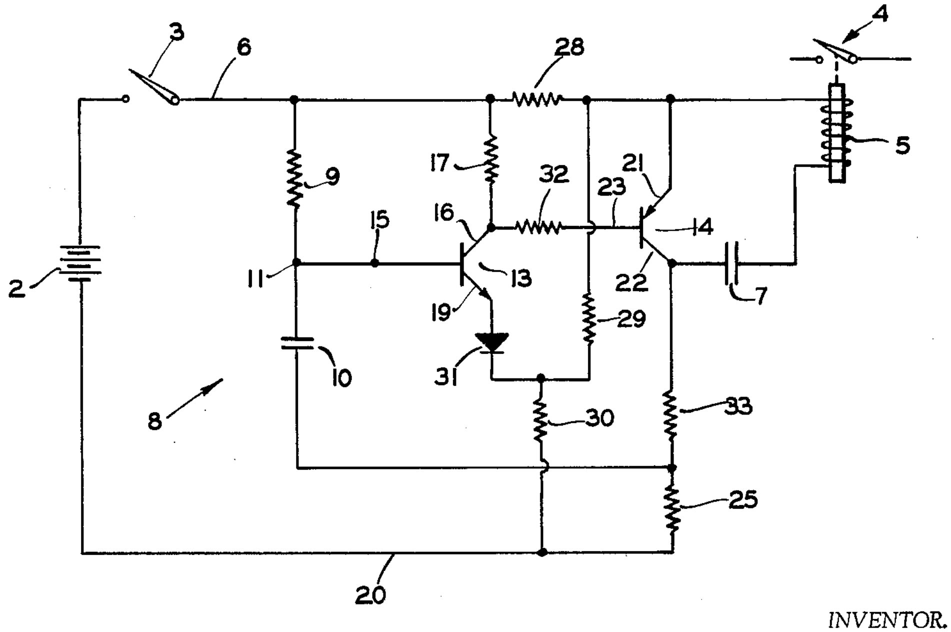
FIGURE 2 is a schematic drawing showing a preferred embodiment of the novel time delay circuit constructed in accordance with the invention.

Referring now to FIGURE 2, there is shown the preferred embodiment of the invention, and like elements in FIGURE 2 are numbered the same as in FIGURE 1.

In FIGURE 2, bias for transistors 13 and 14 is provided by three resistors 28, 29, and 30. Resistor 28 is connected in conductor 6 between resistor 17 and emitter 21 of transistor 14. Resistor 29 is connected between emitter 21 and diode 31 which is connected to emitter 19 of transistor 13. Resistor 30 is connected between a junction of resistor 29 with diode 31 and common potential 20. The resistors bias transistor 13 at the predetermined level beyond cutoff, replacing battery 18 of FIGURE 1. The predetermined bias level beyond cutoff is determined by the ratio $$\frac{\text{Resistor } \mathbf{30}}{\text{Resistor } \mathbf{28}+\text{Resistor } \mathbf{29}+\text{Resistor } \mathbf{30}}$$

Diode 31 may be used to block reverse current from resistor 13.

Resistor 28, in addition to biasing transistor 13, biases transistor 14 against spurious triggering. When switch 3 is closed, there may be a small leakage current ($I_{CBO}$) through transistor 13 which produces a small potential drop across resistor 17 to lower the potential at base 23 of transistor 14. This potential drop may trigger transistor 14 and by the regenerative action of resistor 25, trigger the entire circuit. To avoid this spurious triggering, emitter 21 is held at a lower potential than base 23 by the potential drop across resistor 28. A resistor 32 is connected between collector 16 and base 23 of transistor 14 to limit current to base 23 to a safe operating range. A feedback current limiting resistor 33 between collector 22 and resistor 25 limits current to, and maximum potential across, resistor 25 and prevents excessive potentials at base 15 of transistor 13.

There are many different values of circuit parameters for which the circuit shown in FIGURE 2 will function satisfactorily. Since the circuit parameters may vary according to the design for any particular application, the following circuit parameters are included for the circuit of FIGURE 2 by way of example only.

| | |
|---|---|
| Resistor **9**: 220K | Resistor **25**: 1.1K |
| Resistor **17**: 68K | Capacitor **9**: 60 μf. |
| Resistor **28**: 300Ω | Capacitor **7**: 12 μf. |
| Resistor **32**: 1.1K | Transistor **13**: 2N755 |
| Resistor **29**: 910Ω | Transistor **14**: 2N329A |
| Resistor **30**: 1.3K | Inductance of coil **5**: 1 h. |
| Resistor **33**: 7.5K | Diode **31**: Pair of 1N649 |
| | Potential **2**: +30 v. D.C. |

In summary, there has been shown a novel timing circuit providing a signal after an adjustable predetermined time delay and having a pulse of adjustable predetermined energy content.

While two embodiments of the invention have been illustrated and described in detail, it is to be expressly understood that the invention is not to be limited thereto. Various changes may also be made in the design and arrangement of the parts without departing from the spirit and scope of the invention as the same will now be understood by those skilled in the art.

What is claimed is:

1. A timing circuit for energizing a load after a predetermined time interval, comprising (a) time delay means adapted to receive a signal and provide an output whose amplitude varies with time in accordance with the signal, (b) a first transistor having a control terminal connected to the time delay means for receiving the output and biased to conduct when the output exceeds a predetermined level, (c) a second transistor having a control terminal connected to the first transistor and rendered conducting when the first transistor conducts, (d) a load connected across the second transistor, (e) energy storage means serially connected with the load and adapted to store energy when a potential is applied thereto, and discharge through the load and the second transistor when the second transistor conducts.

2. A timing circuit of the kind defined in claim 1 in which the time delay means comprises a resistor and a capacitor serially connected together and receives the signal across the series combination and provides the output at a junction of the resistor and capacitor.

3. A timing circuit energized by a potential from a source for use with a relay of the type that is set by a signal of one polarity and reset by a signal of the opposite polarity, comprising (a) time delay means including a timing resistor connected to the source and a timing capacitor connected to the timing resistor providing at a junction of the resistor and capacitor an output varying with time according to the time constant of the resistor and capacitor and to the potential, (b) a switching circuit including, (i) a first transistor having a base connected to the junction of the time constant resistor with the timing capacitor, and an emitter connected to the common potential, (ii) a load resistor connecting a collector of the first transistor to the source providing a reduced potential at the collector when the transistor conducts, (iii) a second transistor including a base connected to the collector of the first transistor, (iv) biasing means including a first resistor connecting an emitter of the second transistor to the source for biasing the second transistor nonconducting while the first transistor is nonconducting, second and third biasing resistors connecting the emitter of the second transistor to a common potential and connected at their junction through a diode to the emitter of the first transistor biasing the first transistor a predetermined level beyond cutoff, (c) a regenerative feedback means including a series connection of two resistors between the collector of the second transistor and the common potential, and a conductor between a junction of the two resistors and the timing capacitor of the time delay means, said means providing when the second transistor conducts a potential drop across one resistor which is fed back to the time delay means through the conductor raising the potential of the time delay means driving the transistors to saturation, (d) an energy storage capacitor, (e) a relay having an input coil serially connected with the capacitor, the capacitor and coil connecting the emitter to collector of the second transistor, said coil receiving a pulse of one polarity when the potential is applied setting the relay, the capacitor charging during the application of the potential while the second transistor is nonconducting, and discharging a predetermined time later through the coil and second transistor when the output from the time delay means sets the transistors conducting providing a pulse of opposite polarity to the coil resetting the relay.

4. A timing circuit energized by a potential from a source, comprising time delay means energized by the potential and providing a time delayed signal, switching means connected to the time delay means and rendered conducting when the signal from the time delay means exceeds a predetermined level after a predetermined interval, energy storage means energized by the potential from the source and storing energy upon application of potential thereto, and a relay set by a pulse of one polarity and reset by a pulse of opposite polarity and connected to the source and to the energy storage means and receiving a pulse of one polarity when potential from the source is applied thereto setting the relay, the energy storage means discharging after the predetermined interval through the relay and switching means when the signal from the time delay means renders the switching means conducting to provide a pulse of opposite polarity to reset the relay.

5. A timing circuit comprising a source of potential for energizing the circuit, time delay means energized by the source of potential and providing a time delayed signal, switching means connected to the time delay means and rendered conducting when the sigial from the time delay means exceeds a predetermined level after a predetermined interval, regenerative feedback means from the switching means to the time delay means for increasing the amplitude of the time delay signal, energy storage means energized by the source of potential and storing energy upon application of potential thereto, and a relay set by a pulse of one polarity and reset by a pulse of opposite polarity and connected to the source and to the energy storage means and receiving a pulse of one polarity when potential from the source is applied thereto setting the relay, the energy storage means discharging after the predetermined interval through the relay and switching means when the signal from the time delay means renders the switching means conducting to provide a pulse of opposite polarity to reset the relay.

6. A timing circuit energized by a potential from a source, comprising time delay means energized by the potential and providing a time delayed signal, switching means connected to the time delay means and including a first transistor rendered conducting when the signal from the time delay means exceeds a predetermined level after a predetermined interval and a second transistor connected to the first transistor and rendered conducting when the first transistor conducts, a relay set by a pulse of one polarity and reset by a pulse of opposite polarity, said relay being connected to the source and receiving a pulse of one polarity when the potential of the source is applied thereto setting the relay, a capacitor serially connected with the relay and source and energized by the potential from the source and charging upon application of potential thereto, said capacitor being connected in series with the relay and switching means and discharging after the predetermined interval through the relay and switching means when the signal from the time delay means renders the switching means conducting to provide a pulse of opposite polarity to reset the relay.

7. A timing circuit energized by a potential from a source, comprising time delay means energized by the potential and providing a time delayed signal, switching means connected to the time delay means and including a first transistor rendered conducting when the signal from the time delay means exceeds a predetermined level after a predetermined interval and a second transistor connected to the first transistor and rendered conducting when the first transistor conducts, a regenerative feedback resistor connecting the second transistor and the time delay means to a reference potential to provide feedback to the time delay means when the second transistor conducts, the output of the time delay means driving the transistors to a state of maximum conduction, a relay set by a pulse of one polarity and reset by a pulse of opposite polarity, said relay being connected to the source and receiving a pulse of one polarity when the potential of the source is applied thereto setting the relay, a capacitor serially connected with the relay and source and energized by the potential from the source and charging upon application of potential thereto, said capacitor being connected in series with the relay and switching means and discharging after the predetermined interval through the relay and switching means when the signal from the time delay means renders the switching means conducting to provide a pulse of opposite polarity to reset the relay.

References Cited by the Examiner

UNITED STATES PATENTS

| | | | |
|---|---|---|---|
| 2,559,508 | 7/51 | Meier | 317—142 |
| 2,906,926 | 9/59 | Bauer. | |
| 3,064,165 | 11/62 | Kennedy. | |
| 3,082,329 | 3/63 | Meyer et al. | |

FOREIGN PATENTS

| | | |
|---|---|---|
| 899,354 | 6/62 | Great Britain. |

SAMUEL BERNSTEIN, *Primary Examiner.*